United States Patent [19]
Knox

[11] 4,305,650
[45] Dec. 15, 1981

[54] ILLUMINATION SYSTEM
[75] Inventor: Keith T. Knox, Rochester, N.Y.
[73] Assignee: Xerox Corporation, Stamford, Conn.
[21] Appl. No.: 94,607
[22] Filed: Nov. 15, 1979
[51] Int. Cl.[3] .......................................... G03G 15/00
[52] U.S. Cl. ...................................... 355/3 R; 355/71
[58] Field of Search .................... 355/3 R, 71, 11, 69, 355/70; 362/3, 16, 17, 11, 89

[56] References Cited
U.S. PATENT DOCUMENTS

| | | | |
|---|---|---|---|
| 3,981,577 | 9/1976 | Tsilibes | 355/71 X |
| 4,080,067 | 3/1978 | Massengeil | 355/11 X |
| 4,090,788 | 5/1978 | Massengeil | 355/71 |
| 4,226,527 | 10/1980 | Lama et al. | 355/71 |

Primary Examiner—Richard L. Moses
Attorney, Agent, or Firm—Ronald F. Chapuran

[57] ABSTRACT

The elimination of strobing in an electrophotographic machine by altering the illumination profile of a projected image at the edges of an exposure aperture located near the photoreceptor surface. The illumination profile is altered by use of a transmission filter overlying the aperture and having a linearly tapered transmission profile at the edges of the aperture or using an aperture plate with saw toothed pattern edges defining the aperture.

7 Claims, 5 Drawing Figures

ILLUMINATION SYSTEM

BACKGROUND OF THE INVENTION

The present invention relates to electrophotographic printing and more particularly to illumination systems in electrophotographic printing.

Many electrophotographic printing machines scan the image of an object onto the photoreceptor through an aperture located near the photoreceptor during illumination of the object by a lamp. In this type of machine, the lamp is generally cycled on and off at the rate of 120 Hz.

The light from a fluorescent lamp or other equivalent light source, running on line current, appears to the eye to be continuous. However, since it is flashing at the rate of 120 Hz, the exposure on the photoreceptor consists of many overlapping discrete images through the aperture. The nonuniform overlap of these discrete images or exposures on the photoreceptor, in many cases, results in a series of developed lines on the photoreceptor having a spatial frequency equivalent to the operating frequency of the light source and the speed of the photoreceptor. This problem is generally referred to as strobing. The problem is potentially applicable to any illumination system in which exposure is made by repeated overlapping exposures of a photosensitive surface as produced by a lamp operating at a predetermined frequency or a CRT device displaying information to a platen or an internal flashing source such as a sequential dot screen.

There are methods for compensating for this strobing effect. One method is to increase the frequency of the illumination lamp such as taught in U.S. Pat. No. 3,998,539 assigned to the same assignee as the present invention. This method, however, usually requires a high frequency power supply and adds components and complexity to the illumination system. Another method is to de-focus the aperture plate near the photosensitive surface. However, this is not always a desirable solution since too much de-focus could contribute to tracking errors. It also may be necessary to move the aperture plate in a multiple magnification system. It would be desirable, therefore, to provide a means to eliminate strobing that is reliable and simple and does not require additional components such as a high frequency power supply and readily adapted to a multi-magnification system and could compensate for non-symmetrical illumination.

The problem is often overcome by the retention of the phosphor and the required decay time in the light source. However, in such systems using Xenon or gas discharge light sources, there is frequently little or no retention time of the phosphor. Other methods of overcoming strobing, for example, in cascade development systems, are to provide an aperture width wide enough to smooth the difference illumination between points on the photoreceptor and use larger aperture lenses. This, however, can lead to tracking errors. In addition, absolute development systems, such as magnetic brush development, emphasize defects due to fringe field development. It would be desirable, therefore, to provide a simple means to overcome strobing in an absolute development system that does not decrease image resolution.

Accordingly, it is the primary object of the present invention to improve the illumination system of an electrophotographic printing machine by eliminating the effects of strobing on a photosensitive surface.

Further advantages of the present invention will become apparent as the following description proceeds, and the features characterizing the invention will be pointed out with particularity in the claims annexed to and forming a part of this specification.

SUMMARY OF THE INVENTION

Briefly, the present invention is concerned with eliminating strobing by altering the illumination profile of a projected image at the edges of the aperture located near the photoreceptor. This is accomplished by providing a transmission filter overlying the aperture and having a linearly tapered transmission profile at the edge of the aperture or by providing the aperture plate defining the aperture with saw-toothed pattern edges.

BRIEF DESCRIPTION OF THE DRAWINGS

For a better understanding of the present invention, reference may be had to the accompanying drawings, wherein the same reference numerals have been applied to like parts and wherein.

DETAILED DESCRIPTION OF THE INVENTION

Figure 1:
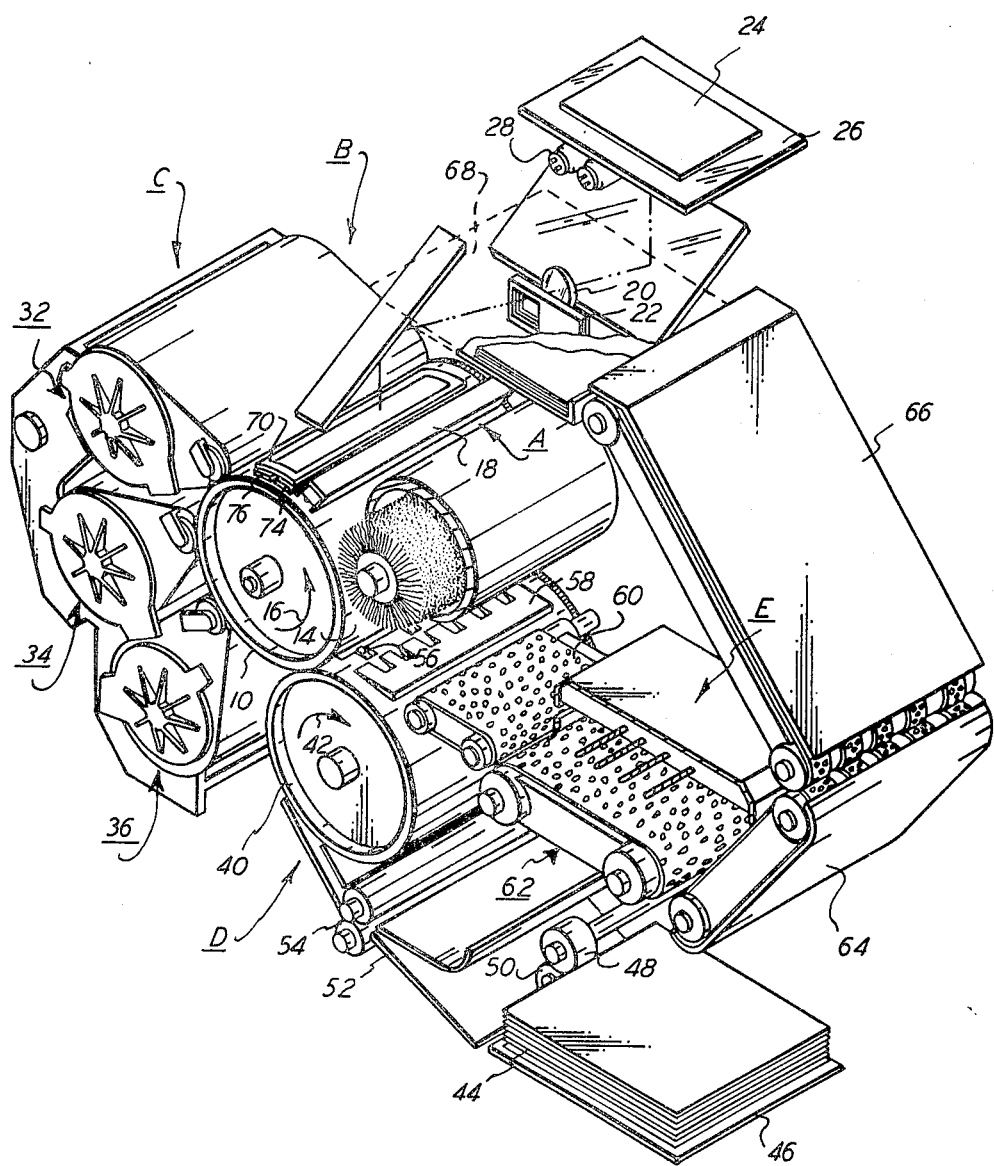
FIG. 1 is an isometric view of an electrophotographic printing machine incorporating the features of the present invention.
Figure 2:
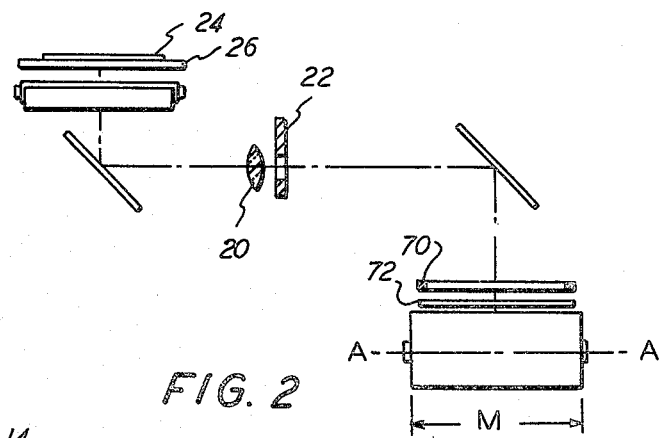
FIG. 2 is an elevational view of the optical path employed in the machine of FIG. 1.

Referring now to the drawings and more particularly to FIG. 1:

As shown in FIGS. 1 and 2, the electrophotographic printing machine includes a photoconductive member comprising a rotatable drum 10 including a conductive substrate having a photoconductive surface 14. Drum 10 rotates in the direction of arrow 16 and a signal generator (not shown) rotates in unison with drum 10 to activate sequentially the various processing stations at the appropriate time during the reproduction cycle.

Figure 3:
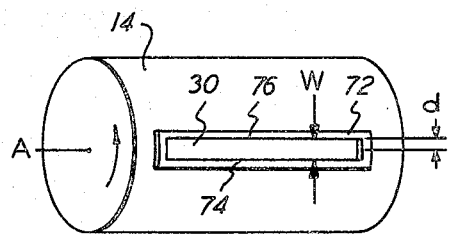
FIG. 3 is a top plan view of the aperture, filter and photoreceptor.

Upon rotation of drum 10, successive portions of photoconductive surface 14 pass through charging station A. Charging station A includes a corona generating device, indicated generally by the reference numeral 18, for charging portions of photoconductive surface 14 to a relatively high substantially uniform level. At exposure station B, the charged area of photoconductive surface 14 is exposed to a color filtered light image of the original document. Lens 20 and filter mechanism 22 located at exposure station B move in synchronism with the rotation of drum 10. Original document 24 is positioned upon transparent viewing platen 26 face down. Lamp assembly 28, located beneath transparent viewing platen 26, illuminates the original document in traversing the platen. The lamp cycles on and off at line frequency, usually 120 Hertz. A flowing light image of original document 24 is projected through aperture 30 disposed near the photoconductive surface onto the charged portion of photoconductive surface 14 as best seen in FIG. 3. The photoconductive surface 14 is selectively discharged and records an electrostatic latent image corresponding to a single color of the informational areas contained in original document 24. During exposure, filter mechanism 22 interposes selected color filters into the optical light path. Successive color filters operate on the light rays passing through lens 20 to crease a single color light image projected onto photoconductive surface 14.

After the modulated single color electrostatic latent image is recorded on photoconductive surface 14, drum 10 rotates the latent image to development station C. Development station C includes three magnetic brush developer units generally designated by the reference numerals 32, 34 and 36, respectively. Developer units 32, 34 and 36 contain differently colored toner particles relating to the complement of the color of the light image transmitted through filter 22.

After development, drum 10 rotates the toner powder image to transfer station D for transferring the toner powder image adhering electrostatically to photoconductive surface 14 to a sheet of support material or copy sheet secured releasably on transfer roll 40. Transfer roll 40 rotates in the direction of arrow 42 to recirculate the copy sheet in synchronism with the angular rotation of drum 10. The transfer roll 40 is electrically biased to a potential of sufficient magnitude and polarity to electrostatically attract toner particles from photoconductive surface 14 to the copy sheet. Successive toner powder images are transferred from photoconductive surface 14 to the copy sheet, in superimposed registration.

With continued reference to FIGS. 1 and 2, the copy sheet is advanced from stack 44 disposed upon tray 46. Feed roll 48, in operative communication with retard roll 50, separates and advances the uppermost sheet from stack 44. The sheet advances into chute 52, and directed into the nip between register rolls 54. Register rolls 54 align and forward the advancing sheet, in synchronism with the movement of transfer roll 40. Gripper fingers 56 releasably secure the copy sheet on transfer roll 40 for movement in a recirculating path. Successive toner powder images are transferred to the copy sheet in superimposed registration with one another forming a multi-layered toner powder image. After transferring the toner powder images to the copy sheet, gripper fingers 56 space the copy sheet from the transfer roll 40. Stripper bar 58 is then interposed to separate the copy sheet from transfer roll 40 and endless belt conveyor 60 moves the copy sheet to fixing station E.

Fixing station E includes a fusing apparatus, indicated generally by the reference numeral 62 providing sufficient heat to permanently affix the multi-layered toner powder image to sheet 38. After fusing, the copy sheet is advanced by endless belt conveyors 64 and 66 to a catch tray 68.

In accordance with the present invention, the image is projected along an optical path through an elongated transmission filter 70 having a predetermined transmission profile. The aperture 30 is defined by an aperture plate 72 having a pair of oppositely disposed elongated edges 74, 76 and the aperture plate 72 is positioned intermediate the transmission filter 70 and the photoconductive surface 14 as best seen in FIGS. 1, 2 and 3. The transmission filter 70 and aperture plate 72 extend along the width M of the photoconductive surface 14 on a longitudinal axis generally perpendicular to the direction of movement of the photoconductive surface 14 at the aperture 30. In other words, the longitindual axes of the transmission filter 70 and plate 72 are parallel to the axis of rotation A—A of the photoconductive surface 14.

In FIG. 3, there is illustrated the relationship of the aperture plate 72 and aperture 30 with respect to the photoconductive surface 14 as viewed from the transmission filter 70. The elongated edges 74, 76 of the aperture plate 72 define a width W of aperture 30 extending generally in the direction of travel of the photoconductive surface 14 at aperture 30. In other words, the width W is the distance traversed by an arbitrary point on the photoconductive surface 14 in the direction of rotation of surface 14 as the point travels from edge 74 to edge 76. An illumination profile is projected through transmission filter 70 and aperture 30 onto photoconductive surface 14. The filter 70 and aperture plate 72 are both securely fastened to (not shown) machine components.

Figure 4:
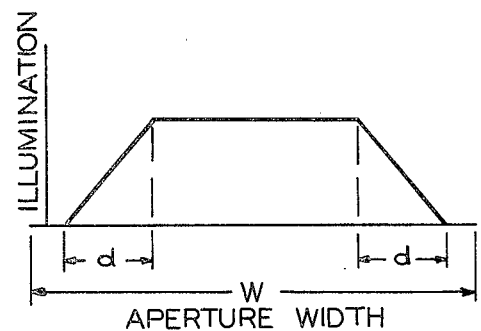
FIG. 4 illustrates an illumination profile of a transmission filter in accordance with the present invention.

In accordance with the present invention, an illumination profile to eliminte strobing is shown in the graph in FIG. 4. This illumination profile provided by transmission filter 70 extends across the width W of the aperture 30. The abscissa of the graph represents distance and, in particular, the width of the scanning aperture W. The ordinate of the graph represents the amplitude or intensity of illumination shown to be generally constant at the center of the aperture but tapering linearly to zero illumination at or near the edges of the aperture 30.

In other words, an arbitrary point on the photoconductive surface 14 traveling from edge 74 to edge 76 as seen in FIG. 3 receives the degree of illumination as shown in FIG. 4 moving from left to right. That is, there is zero illumination of the point at edge 74 and as the point moves into the aperture 30, the illumination rises linearly to a generally constant level. Illumination is generally constant on the arbitrary point in the center of the aperture, the illumination on the point begins to taper as the point approaches edge 76, and finally illumination on the point descends to zero as the point reaches edge 76.

It has been found that a transmission filter providing this type of illumination profile through an aperture and across a photoconductive surface, in particular having a linear slope of the illumination profile to zero at the edges of the aperture, will eliminate strobing. It should be noted that even if not linearly tapered as shown, strobing can be significantly reduced as long as the illumination profile varies smoothly at the edges of the aperture.

A more precise control of strobing is achieved by control of the amount of aperture distance required for the profile to increase from zero to a relatively constant level or to decrease from the constant level to zero illumination. This is the distance d as shown in FIGS. 3 and 4. It has been found that the distance d should be an integral multiple of the distance traveled by the photoconductive surface between lamp periods. That is, the distance traveled by the photoconductive surface during the time between flashes of the lamp should be d or an integral multiple of d. The distance is, of course, a function of lamp frequency and speed of the photoconductive surface. Therefore, the distance d is determined by the ratio of the speed of the photoconductive surface to the flashing rate of the illumination lamp.

If this ratio remains constant, strobing is eliminated. If the ratio varies then the transmission filter provides a smoothing effect to reduce the amount of strobing. The overall width of the aperture W, is not restrictive. In other words, the overall shape of the aperture can be whatever shape is necessary to achieve a desired exposure, such as the standard butterfly shape. The only requirement is that the transmission filter 70 provide an illumination profile that tapers toward zero illumination at the edges of the aperture.

Figure 5:
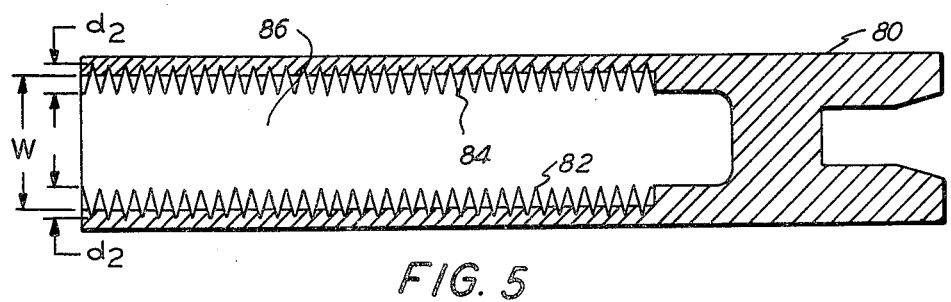
FIG. 5 is a plate having a saw-toothed edge defining an aperture in accordance with the present invention.

Strobing can also be eliminated without the use of the transmission filter 70 by suitable design of the edge characteristics of the aperture plate 72. In an alternative embodiment as shown in FIG. 5, the actual edges of the aperture plate 72 are modified to produce the same illumination profile on the photoconductive surface near the edges of the aperture as produced by the filter 70 having predetermined transmission characteristics. With reference to FIG. 5, there is shown an aperture plate 80 with elongated edges 82, 84 having a trough and peak or saw-toothed design.

The aperture plate 80 replaces the plate 72 shown in FIG. 2 and no transmission filter is required. The edges extend along the width M of the photoconductive surface 14 and the longitudinal axis of the plate 80 is generally parallel to the axis of rotation of the photoconductive surface 14. The saw-toothed edges define an aperture 86 and arbitrary points on the photoconductive surface 14 travel across aperture 80 from edge 82 to edge 84. Only one-half of the aperture plate is shown and the saw-teeth are exploded in scale for illustration. Generally there would be a very high frequency sawtooth pattern.

In replacing the smooth edges of an aperture plate such as shown in FIG. 3 with a saw-tooth pattern, the imaginary line defined by the approximate mid-points of the saw-teeth would locate the smooth edges. That is, the width W of the aperture 30 as seen in FIG. 3 would generally extend between the imaginary lines defining the mid-points of the teeth as shown in FIG. 5. The illumination profile on the photoconductive surface through aperture 86 would be similar to the profile shown in FIG. 4. That is, the illumination would rise from zero illumination at edge 84 to a constant illumination and then taper toward zero illumination at edge 82.

Precise control of the illumination profile is determined by the distance $d_2$ defined as the distance from trough to peaks of the saw-teeth. Distance $d_2$ is analogous to the distance d regarding the transmission filter 70, in that preferably the distance $d_2$ is an integral multiple of the distance traveled by the photoconductive surface between cycles or flashes of the illumination lamp.

In a specific embodiment, the distance $d_2$ of the teeth was 2/15 of an inch for a photoreceptor speed of 4 inches per second and a cycle rate of 60 hertz. The distance $d_2$ therefore was twice the distance traveled by the photoconductive surface between flashes. The edge profile as shown in FIG. 5 was generated on a computer and then output on a piece of photographic film. It was then taped over the edges of a standard plate defining a butterfly shaped aperture.

While there has been illustrated and described what is at present considered to be a preferred embodiment of the present invention, it will be appreciated that numerous changes and modifications are likely to occur to those skilled in the art, and it is intended in the appended claims to cover all those changes and modifications which fall within the true spirit and scope of the present invention.

I claim:

1. An electrostatographic printing machine having optical components for scanning an image of a document onto a moving photoconductive surface and a light source for illuminating the document, the light source having a predetermined illumination frequency the improvement comprising
an elongated transmission filter and a plate with elongated oppositely disposed edges defining an aperture, the filter and elongated edges extending transversely the direction of movement of the photoconductive surface across the aperture, the plate being disposed intermediate the filter and the photoconductive surface, the illumination profile on the photoconductive surface tapering from a relatively constant value in the center of the aperture toward zero illumination at each elongated edge of the plate, the distance from the start of taper to end of taper of the illumination profile on the photoconductive surface being an integral multiple of the distance traversed by the photoconductive surface between illuminations of the light source.

2. The printing machine of claim 1 wherein the transmission element is a plate with a pair of oppositely disposed elongated edges defining an aperture extending transversely the direction of movement of the photoconductive surface across the aperture, the edges of the aperture being disposed in a peak and trough pattern.

3. The printing machine of claim 2 wherein the light source has a predetermined illumination frequency and the distance from peak to trough is an integral multiple of the distance traversed by the photoconductive surface between illuminations of the light sources.

4. The printing machine of claim 1 wherein the transmission element has a relatively narrow width dimension W, the width W extending generally in the direction of motion of the photoconductive surface at the transmission element, the ends of the illumination profile tapering from a relatively high illumination level on the photoconductive surface relative to the center of the dimension W toward zero illumination on the photoconductive surface relative to the end points of the dimensions W.

5. The printing machine of claim 1 wherein the aperture has a width extending in the direction of travel of the photoconductive surface of the aperture and the illumination profile tapers to zero illumination from the center of the width W of the aperture to the ends of the width W of the aperture.

6. An electrostatographic printing machine having a photoconductive surface rotating about an axis, an aperture plate defining an aperture disposed near the photoconductive surface, optical components for scanning an image of a document along an optical path through the aperture onto the moving photoconductive surface and a light source for illuminating the document, the light source having an illumination frequency, the improvement comprising:
an elongated transmission filter disposed in the optical path intermediate the document and the aperture platen, the transmission filter extending along the width of the photoconductive surface along an axis parallel to the axis of rotation of the photoconductive surface, the transmission filter providing an illumination profile on the photoconductive surface in the direction of movement of the surface across the aperture wherein the ends of the illumination profile taper from a constant illumination toward zero illumination and wherein the distance from the start of taper to the end of taper is defined by d, d being an integral multiple of the distance travelled by the photoconductive surface between illuminations of the light source.

7. An electrostatographic printing machine having a photoconductive surface rotating about an axis, an aperture plate with elongated edges extending parallel to the axis of rotation of the photoconductive surface, the elongated edges defining an aperture disposed near the photoconductive surface, optical components for scanning an image of a document through the aperture onto the moving photoconductive surface, a light source having an illumination frequency for illuminating the document, the elongated edges comprising a saw-tooth pattern wherein the distance from peak to trough of the saw-teeth is an integral multiple of the distance traversed by the photoconductive surface between illuminations of the lamp.

* * * * *